Figure 1:
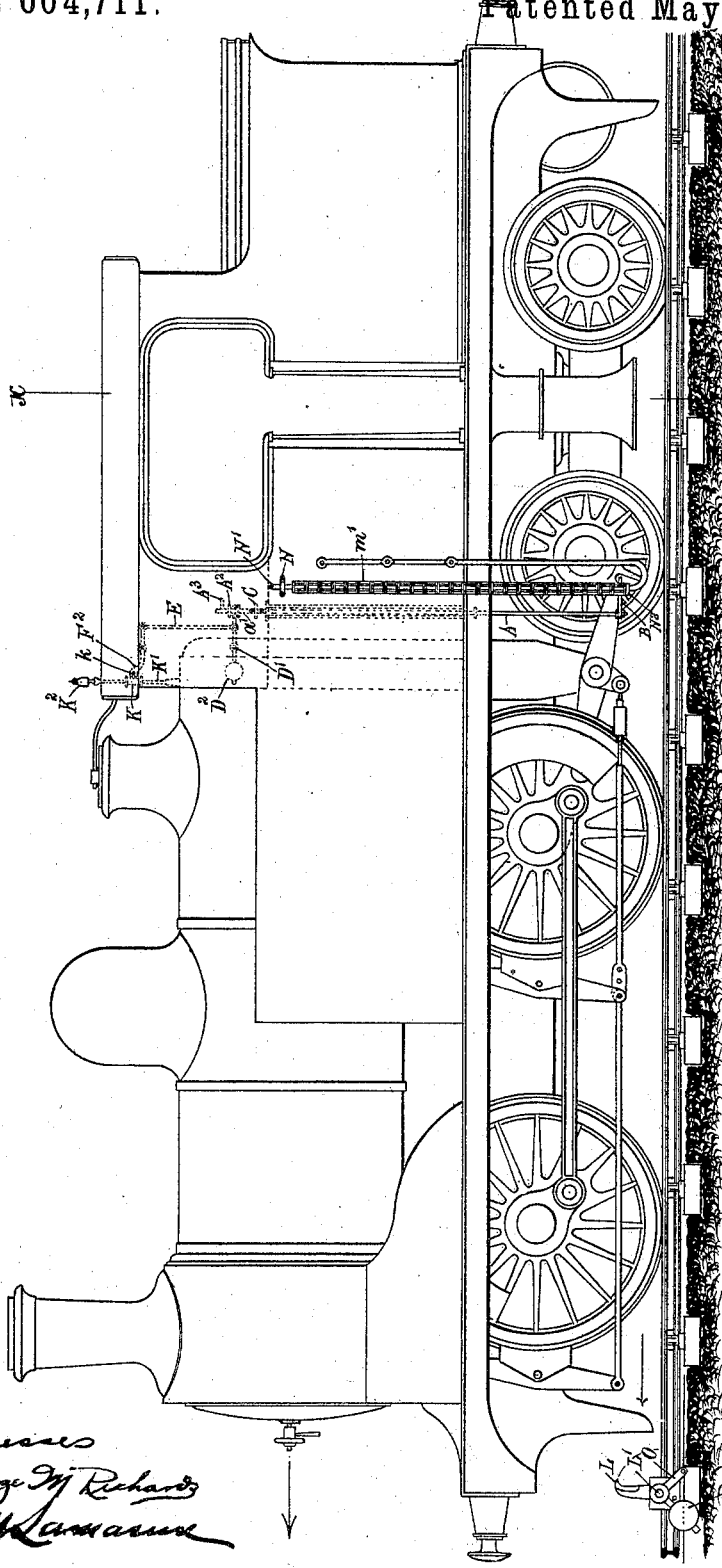

(No Model.) 4 Sheets—Sheet 1.

W. T. C. PRATT, Dec'd.
W. H. BABCOCK, Administrator.
RAILWAY SIGNALING APPARATUS.

No. 604,711. Patented May 31, 1898.

Witnesses
George W. Richards
G. W. Lamasure

W. H. Babcock
Administrator
For
Wm. T. C. Pratt
Inventor (No Model.) 4 Sheets—Sheet 2.
W. T. C. PRATT, Dec'd.
W. H. BABCOCK, Administrator.
RAILWAY SIGNALING APPARATUS.
No. 604,711. Patented May 31, 1898.
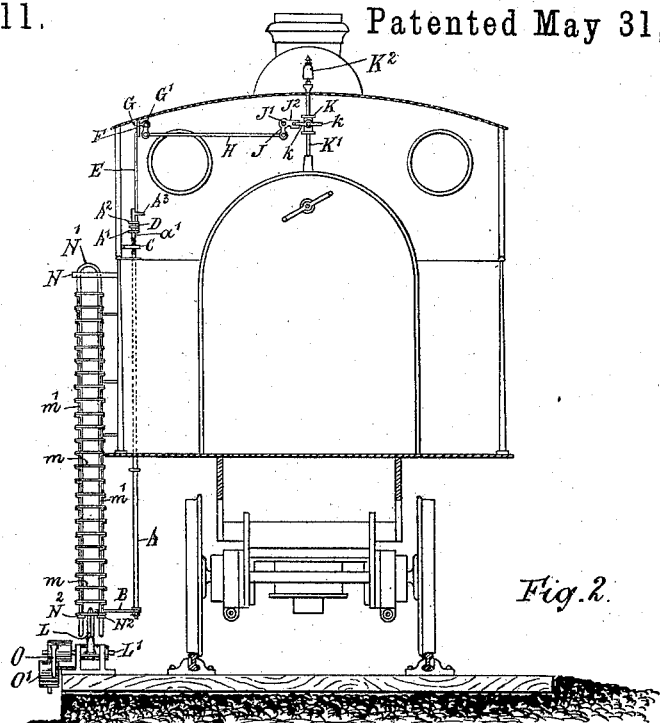
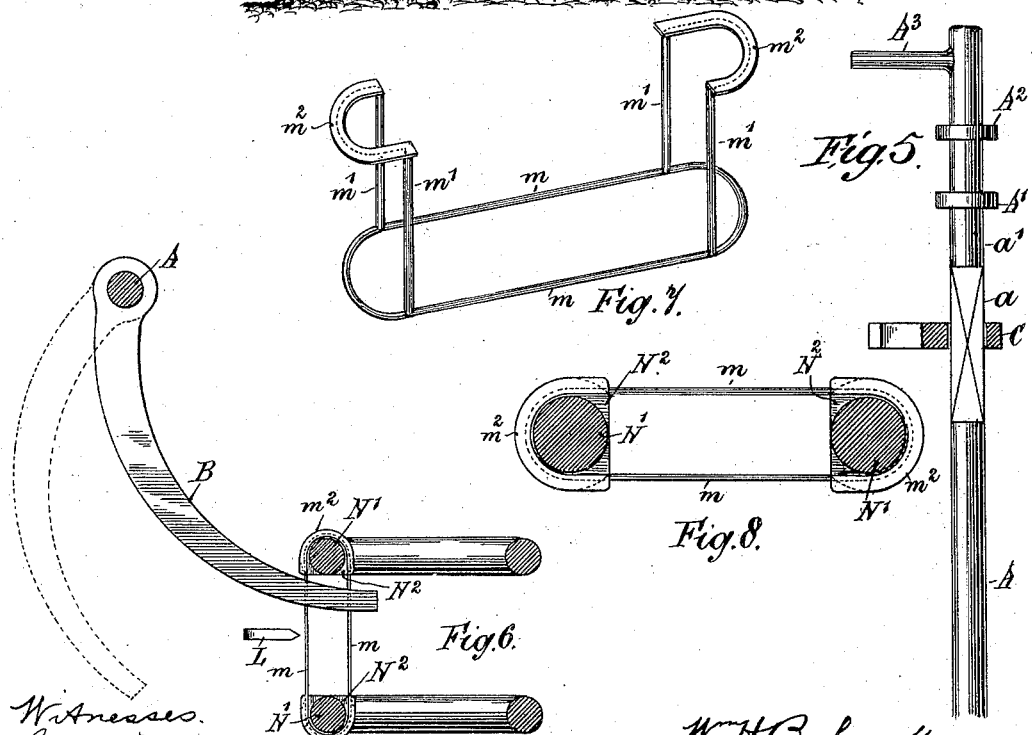
Witnesses.
George W. Richards
G. M. Lamasure
W. H. Babcock
Administrator
For W. T. C. Pratt
Inventor.
THE NORRIS PETERS CO., PHOTO-LITHO., WASHINGTON, D. C.

(No Model.) 4 Sheets—Sheet 3.

W. T. C. PRATT, Dec'd.
W. H. BABCOCK, Administrator.
RAILWAY SIGNALING APPARATUS.

No. 604,711. Patented May 31, 1898.

Witnesses
George M Richard
G M Lamasure

W H Babcock
Administrator
for Wm T C Pratt
inventor (No Model.)
W. T. C. PRATT, Dec'd.
W. H. BABCOCK, Administrator.
RAILWAY SIGNALING APPARATUS.
No. 604,711. Patented May 31, 1898.
4 Sheets—Sheet 4.
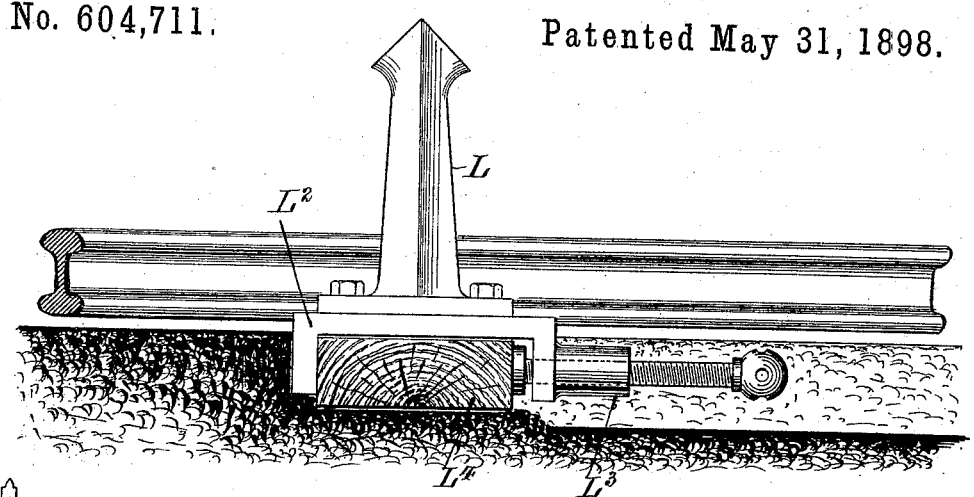
Fig. 11.
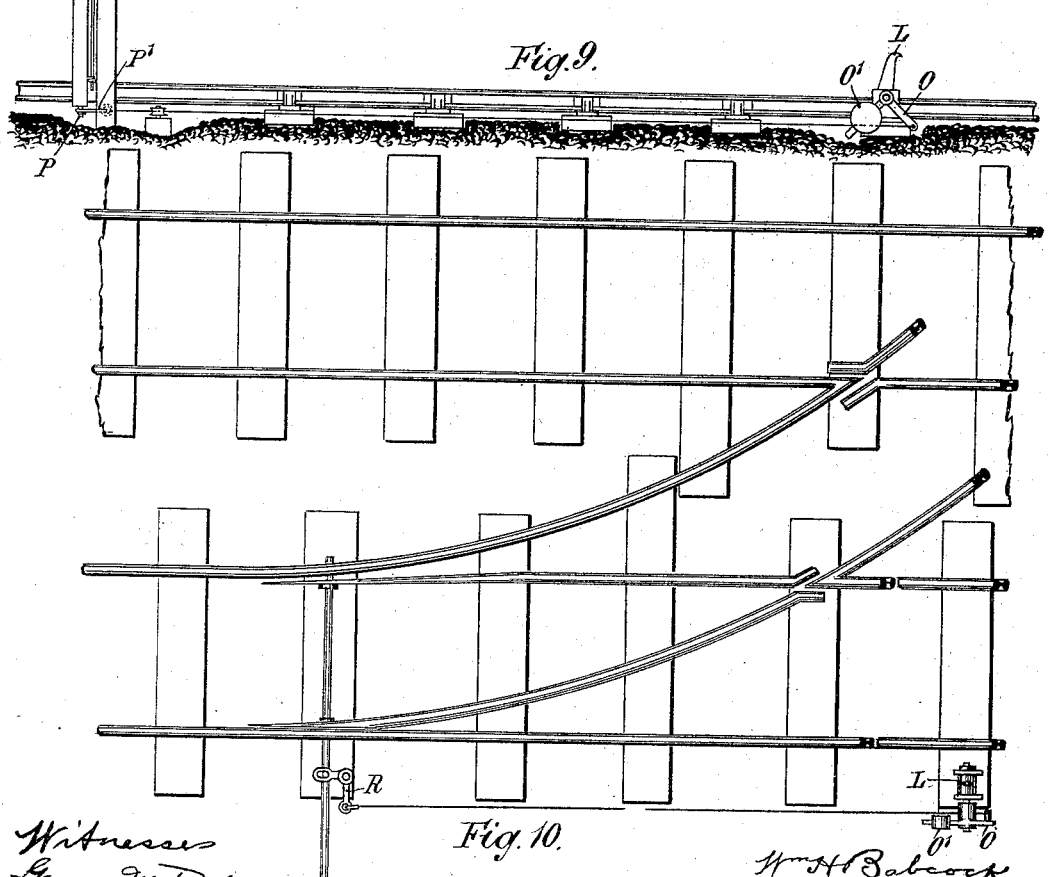
Fig. 9.
Fig. 10.
Witnesses
George M. Richard
G. M. Lamasure
W. H. Babcock
administrator
For W. T. C. Pratt
Inventor
THE NORRIS PETERS CO., PHOTO-LITHO., WASHINGTON, D. C.

UNITED STATES PATENT OFFICE.

WILLIAM H. BABCOCK, OF WASHINGTON, DISTRICT OF COLUMBIA, ADMINIS-TRATOR OF WILLIAM T. C. PRATT, DECEASED, ASSIGNOR TO EMMELINE ANN PRATT, EMMELINE FRANCES PRATT, AND CHARLES CLARIDGE PRATT, OF SNEYD PARK, AND MARY ANN BLANCHE WRENFORD, NÉE PRATT, OF PORTSEA, ENGLAND.

RAILWAY SIGNALING APPARATUS.

SPECIFICATION forming part of Letters Patent No. 604,711, dated May 31, 1898.

Application filed December 7, 1897. Serial No. 661,093. (No model.) Patented in England November 30, 1896, No. 27,185.

*To all whom it may concern:*

Be it known that WILLIAM T. C. PRATT, formerly a citizen of Great Britain, lately residing at Sneyd Park, near Bristol, county of Gloucester, England, deceased, (WILLIAM H. BABCOCK, a citizen of the United States, residing near Washington, District of Columbia, administrator of said PRATT,) did in his lifetime invent certain new and useful Improvements in Railway Signaling Apparatus; and it is hereby declared that the following is a full, clear, and exact description of the said invention, such as will enable others skilled in the art to which it appertains to make and use the same.

The said invention has been already patented in Great Britain by Letters Patent No. 27,185, dated November 30, 1896.

This invention relates to improvements in railway signaling apparatus described in the specification of the United States Patent No. 567,865, dated September 15, 1896.

The object of this invention is, first, to so connect those parts of the aforesaid apparatus which are carried by or fitted on or to the locomotive as to remove or minimize the tensional or other strain caused by the weight of said parts on the whistle-spindle or other movable part to which the apparatus is connected; secondly, to provide means whereby, after the cutting or rupture of the ring or frame by the knife or cutter fixed on or adjacent to the permanent way, another such ring or frame shall automatically fall into position ready for the next adjustment of the various parts in the set position by the driver or other person in charge of the engine, and, thirdly, to adapt the knife or cutter to be operated otherwise than from the signal-box.

Figure 3:
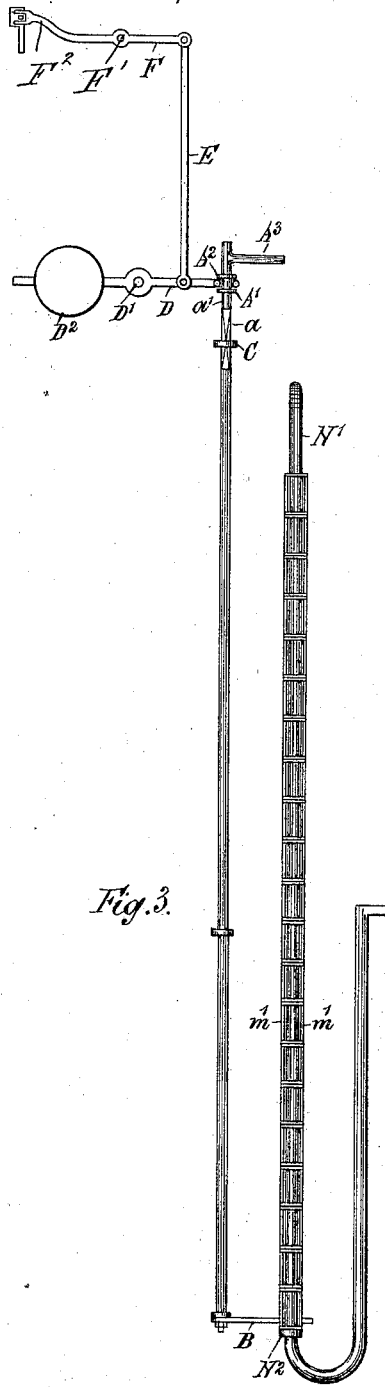
Figure 4:
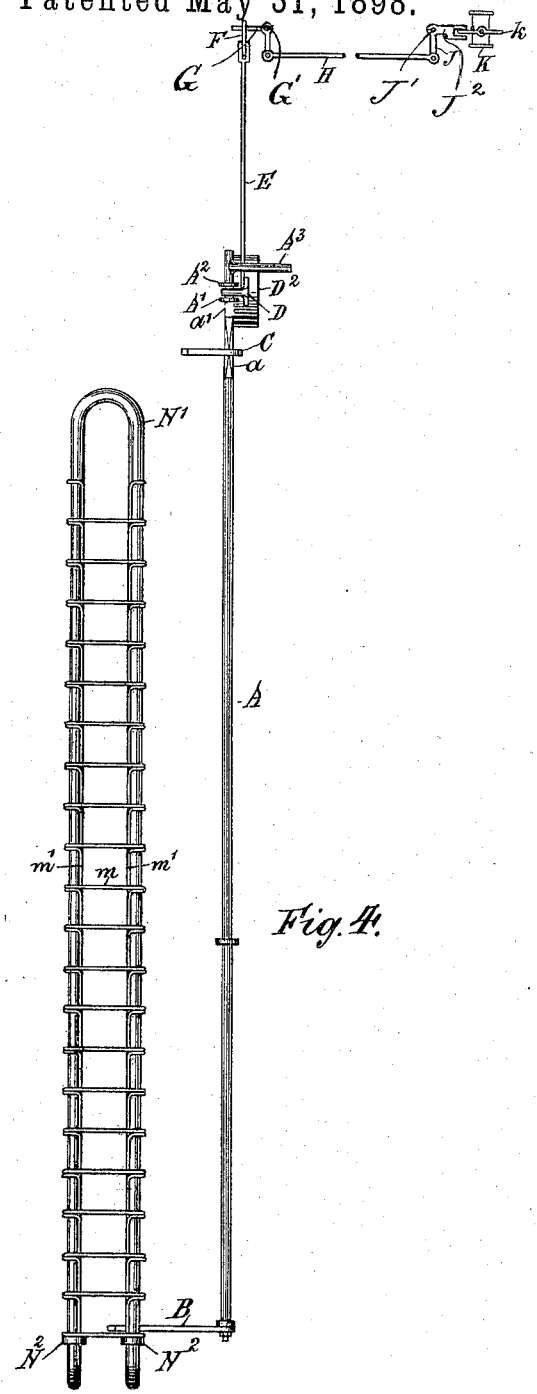

In the accompanying drawings, Figure 1 is a side elevation showing part of a railway-track and an engine and tender with the invention fitted thereto and on one side thereof. Fig. 2 is a vertical section taken on the line $x\ x$ of Fig. 1. Figs. 3 and 4 are enlarged detached side and end elevations of those parts of the apparatus which are carried by or fitted on or to the locomotive. Figs. 5 to 8 are further enlarged detail views; and Figs. 9 to 11 show modifications of the invention, all of which will be more fully explained hereinafter.

The same letters of reference, where they occur, are used to indicate the same or corresponding parts in all the figures.

To carry out the first part of this invention, the parts are constructed and arranged in the manner shown in Figs. 1 to 6 of the accompanying drawings.

A is the vertical rod, to the lower end of which is fixed a radial hook or horn shaped arm B, (see Figs. 3, 4, and 6,) which when the apparatus is in the set position rests on the ring or frame in the manner described in the aforementioned patent specification. Near its upper end this rod A is squared in cross-section, as shown at $a$, Fig. 5, and for the rest of its length the said rod is of circular section. C is a horizontal bracket which is rigidly affixed to or is integral with the side of the cab or tender or other part of the locomotive and is provided with a square aperture of corresponding size to the squared section $a$ on the rod, and through this aperture the rod A passes. Above the squared section $a$ of the rod A is a short cylindrical section $a'$, above which are two fixed collars $A'\ A^2$, and a fixed arm or handle $A^3$ (see Fig. 5) is situated at or near its top and so as to be within easy reach of the driver or other person in charge of the engine. Between the collars $A'\ A^2$ is linked one arm of a lever D, (see Figs. 3 and 4,) having a center of motion at $D'$ on the cab or other fixed part of the engine and provided with a counterweight $D^2$, which latter is nearly heavy enough to balance the parts on the other side of the fulcrum $D'$. On the side of the lever D to which the vertical rod A is connected the lower end of a link E is pivoted, its upper end being pivoted to one arm of a lever F, having a fixed center of motion at $F'$ and bifurcated at its other end, as shown at $F^2$ in Figs. 1 and 3. Between the furcations at $F^2$ is pivoted one arm of a bell-crank lever G, having a fixed center of motion at G' and connected by the link H to another bell-crank lever J, turning on a fixed center J'. (See Figs. 2 and 4.) The free end $J^2$ of this bell-crank J is bifurcated, and the furcations thereof lie one above and the other below the handle $k$, fixed on the spindle of a plug cock or valve K in the branch steam-pipe K', leading to the steam-whistle $K^2$. (See Fig. 2.) The action of this part of the apparatus will now be understood. When the vertical rod A falls in the manner to be explained hereinafter, the arm of the lever D is drawn down against the counterweight $D^2$ and the motion is transmitted, through the system of links and levers E, F, G, and H, to the bell-crank J, the bifurcated end $J^2$ of which is depressed, thereby turning the handle $k$ through a downward angle of about forty-five degrees and opening the valve to that extent, which is sufficient to allow the steam to pass to the whistle. By this construction the weight of the rod A and its connections is carried by the fixed centers D', F', G', and J', and consequently there is no undue strain on the spindle of the valve $k$. To return the parts to the normal position shown in the drawings, the driver or other person in charge rotates the rod A through an angle of ninety degrees by means of the handle $A^3$ thereon. In falling the rod A has passed so far that the square section $a$ thereon has passed completely through the squared aperture in the bracket C. Consequently the cylindrical section $a'$ on the rod lies in said square aperture and can be easily turned therein. When the rod has been turned through a right angle, as beforesaid, the radial hook-arm B is clear of the path of the rings or frames. The rod A is then raised until the squared section $a$ is above the square aperture in the bracket C. It is then turned back again through a right angle to bring the arm B to the full position shown in Fig. 6, when the rod A is gently lowered until the arm B rests upon the base of the ring or frame which has fallen into the lowest position, in the manner to be explained hereinafter. The parts are then again in the set position shown in Figs. 1 to 4.

The squared section $a$ of the rod A keeps the latter steady in position against the vibration set up by the motion of the engine when traveling.

When it is desired to sound the whistle during the running of the locomotive, this can be effected by the driver raising the rod slightly above the normal position shown in the drawings. This will have the effect of operating the system of links and levers in an opposite direction to that already described, causing the bifurcated end $J^2$ of the bell-crank J to be raised sufficiently to turn the handle $k$ through an upward angle of about forty-five degrees, which again will allow sufficient way for the passage of steam through the valve to the whistle.

It will be understood that instead of operating the valve of the whistle the mechanism hereinbefore described may be connected to the gong of a bell or may be made to complete an electrical circuit containing a bell fixed on the cab of the locomotive or may be otherwise connected so as to give an audible or other signal to the driver or other attendant in or on the train every time the rod A falls below the normal set position.

To carry out the second part of this invention, the rings or frames which are cut or ruptured by the knife or cutter fixed on or adjacent to the permanent way are made of such a shape that they may be placed in a series, one above the other, each said frame supporting the one immediately above it. Consequently when the lowermost is cut or broken and falls on the track the next lowermost will, by virtue of its own weight and that of the others superimposed upon it, fall into proper position ready to act as a support to the radial arm B when the apparatus is adjusted to the set position, all the superimposed rings or frames of course falling down one step in the series. Fig. 7 is a perspective view, and Fig. 8 a plan, of a ring-frame suitable for the purpose, although it is not intended to confine the same to the particular shape therein shown, all that is necessary being that it shall be sufficiently rigid, have a base made of an easily-separable material, preferably copper, and be furnished with vertical limbs or members supporting an upper section large enough to form a foundation for the base of the next frame above. In the form shown the base $m$ is made in the shape of an oval ring in which are four posts $m'$, arranged in pairs near the ends of the ring, each pair carrying a flanged top section $m^2$, so made as to support the base of the frame above. Fig. 6 shows the position of the knife or cutter L on the track relatively to the separable base $m$ of the frame. The height of the posts $m'$ is made so that the knife or cutter L will only cut the base of the lowermost frame, as shown in Fig. 2. These ring-shaped frames are passed through a U-shaped horizontal frame N and threaded on a central vertical guide-frame N', open in the center at the bottom, so that the knife may pass through, both frames N and N' being bolted or otherwise secured to a convenient part of the engine. The frame N' is provided with a collar or collars $N^2$ at its lower end, so situated as to support the lowermost ring-frame in such a position that its base will be severed by the knife or cutter L. The action of this part of the apparatus is as follows: When the traveling train arrives at a knife or cutter L raised in the operative position, the separable base $m$ of the ring-frame is cut or severed and falls from the guide-frame onto the track. Thereupon, the support being removed from the radial arm B, the rod A falls and the mechanism on the locomotive is set off and the signal given in the manner above described.

Although the invention is shown and described as applied to one side of the locomotive and the track, it may be adapted to either or to both sides or centrally, if so desired, the method of adaptation being easily understood by persons having a knowledge of railway engineering.

In Figs. 1 and 2 is shown the knife or cutter L, fitted to be operated from the signal-box by the ordinary signal-lever connections, the knife or cutter L being raised to the operative position by means of the counterweight O' on the bell-crank lever O, which latter is fast on a horizontal arm L', to which the knife or cutter L is fixed. The knife is lowered to the horizontal "all-clear" position by a pull on the signal-lever. The arrows in Fig. 1 show the direction of the pull of the signal-lever and the direction of travel of the locomotive, respectively. When the pull on the signal-lever is released, the counterweight returns the knife to the vertical operative position shown in the drawings. The travel of the knife or cutter is only through an angle of ninety degrees from the horizontal position to the vertical, and so that when raised the knife is perfectly rigid.

In Fig. 9 is shown how the knife L may be operated by a gate on a level crossing, so that when the gate is open to allow the passage of vehicles, &c., across the track the knife or cutter L connected to the gate shall be in the raised operative position and lowered again when the gate is closed. This is effected by simply connecting the lever O to an arm P' on the gate $P^2$ and at right angles thereto and near the hinge or pivot P, on which the gate $P^2$ turns. In the figure the gate is shown open across the track, and the knife, which is placed a suitable distance away to allow the train to be brought to a standstill before it reaches the gate, is raised. Instead of being connected to the gate the knife mechanism may be connected to some part of a bridge or other structure, so as to bring the knife to the operative position when the structure collapses.

In Fig. 10 is shown the knife connected to the points of a track, so as to be raised to the operative position when the points are open and lowered when the points are closed, and therefore safe for the train to travel thereover. This is effected by connecting the lever O to the bell-crank R, by which the points are operated.

In Fig. 11 is shown a modified form of a knife or cutter adapted to be fitted by platelayers or others to signal to an approaching train to stop. In this case the knife is a double-edged one and is permanently fixed in a vertical position on a foot or base $L^2$, which latter is fitted with a thumb or other screw $L^3$ to form a clamp by which it may be temporarily secured to a sleeper $L^4$.

What is claimed as the invention, and desired to be secured by Letters Patent, is—

1. In railway signaling mechanism actuated by a stationary cutter, the combination of a part carried by the train and arranged to be severed by the said cutter, with a device arranged to fall on such severance, a signal and the system of links and levers consisting of the link E, connected with the said device, the lever, F, connected with said link E, the lever G, actuated by said lever, F, and the link, H, connected with said lever, G, and actuating the said signal, for operating the latter, the said links and levers serving to minimize the strain on the operative parts of the said signal substantially as set forth.

2. In railway signaling mechanism actuated by a stationary cutter, the combination of a series of superposed ring-frames carried by the train, with a device supported by the lowest ring-frame and arranged to fall on its severance, a signal and connections between the said device and the said signal for operating the latter, the said ring-frames supporting one another, in order that by the severance and consequent removal of the lowest ring-frame, the next lowest ring may automatically take the lowest position, supporting the said device and ready to be struck and severed by the cutter substantially as set forth.

3. In railroad signaling mechanism a stationary, vertical, double-edged knife provided with a base and a clamping device which is adapted to fasten the said knife temporarily to any of the sleepers of a track, in combination with a signal-controlling device carried by the train, and arranged to be cut by the said knife substantially as and for the purpose set forth.

In testimony whereof I affix my signature in presence of two witnesses.

WM. H. BABCOCK,
*Administrator of the estate of William T. C. Pratt.*

Witnesses:
 GEORGE M. RICHARDS,
 SOLON C. KEMON.